United States Patent [19]

Ohgi

[11] 4,243,189
[45] Jan. 6, 1981

[54] TEMPERATURE STABILIZED LINKAGE

[75] Inventor: George Y. Ohgi, Mercer Island, Wash.

[73] Assignee: The Boeing Company, Seattle, Wash.

[21] Appl. No.: 970,724

[22] Filed: Dec. 18, 1978

[51] Int. Cl.³ .......................... B64C 9/02; B64C 19/00
[52] U.S. Cl. ................................ 244/75 R; 244/213; 74/469
[58] Field of Search ............................... 244/213–216, 244/219, 83 J, 83 A, 83 G, 75 R, 76 R, 87, 123, 88, 90 R; 74/469, 470; 60/39.32; 52/1

[56] References Cited

U.S. PATENT DOCUMENTS

| | | | |
|---|---|---|---|
| 2,524,605 | 10/1950 | Servanty | 244/216 |
| 2,575,532 | 11/1951 | Sears | 244/90 R |
| 3,140,066 | 7/1964 | Sutton et al. | 244/215 |
| 3,327,552 | 6/1967 | Broders et al. | 74/469 |
| 3,675,376 | 7/1972 | Belew | 52/1 |
| 3,768,760 | 10/1973 | Jensen | 244/123 |
| 3,838,604 | 10/1974 | Meister | 244/75 R |
| 3,999,726 | 12/1976 | Carlson et al. | 244/83 J |

OTHER PUBLICATIONS

Astronautics and Aeronautics, p. 26, Jul./Aug. 1974.

Primary Examiner—Galen L. Barefoot
Attorney, Agent, or Firm—Daniel T. Anderson; B. A. Donahue

[57] ABSTRACT

A temperature compensated passive linkage for interconnecting two members having different coefficients of expansion. Preferably the linkage is utilized for interconnecting the stabilizer of a plane with its elevator. The stabilizer may be a graphite epoxy composite while the elevator may consist of aluminum-fiberglass. The differences in the rate of expansion of the two members is compensated by the linkage of the invention which in turn will move a side load hinge fitting to minimize aerodynamic and mechanical problems.

7 Claims, 2 Drawing Figures

TEMPERATURE STABILIZED LINKAGE

The invention discribed herein was made in the performance of work under a NASA contract and is subject to the provisions of Section 305 of the National Aeronautics and Space Act of 1948, Public Law 85-568. (72 Stat. 435; 42 US.C. 2457).

BACKGROUND OF THE INVENTION

This invention relates generally to mechanical linkages and particularly to a temperature stabilized linkage particularly adapted for use with an airplane stabilizer and elevator.

The present invention is particularly designed for use with a tail assembly of a modern jet plane. The tail assembly may include a horizontal stabilizer and elevator adapted to be rotated out of the plane of the stabilizer.

Recently attempts have been made to manufacture the stabilizer of a composite material while retaining the presently used aluminum elevator. Due to the difference between the coefficients of thermal expansion of aluminum and a composite structure various problems arise.

One attempt was made to retain the existing aluminum trailing edge beam and fiberglass trailing edge panels of the stabilizer. This, of course, minimizes the differences of the thermal expansion at the elevator hinges. However, it has been found that many pieces of special hardware would be required to support the trailing edges. Also the trailing edge components required more extensive revision than initially anticipated.

The second approach was to use graphite epoxy trailing edge beams, as well as a composite material stabilizer. This, of course, minimizes thermal stress and deformation in the trailing edge structure of the stabilizer. On the other hand, the thermal expansion differences at the elevator hinges become much greater.

Therefore, a temperature compensated linkage was designed to compensate these thermal differences.

Such a thermal compensating structure member has been disclosed in the patent to Belew U.S. Pat. No. 3,675,376. This structural member is used in an antenna structure and includes an aluminum casing and a titanium casing which will expand differentially. This in turn will rotate a link 44 to compensate for effects of changes in temperature.

Reference is also made to a patent to Broders et al., U.S. Pat. No. 3,327,552 which also discloses a temperature compensated linkage. It is to be used for the turbine engine parts of an aircraft engine. Here one of the supporting structures is moved with respect to another. The linkage is so designed as to compensate for the rather violent temperature changes of a turbine engine.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
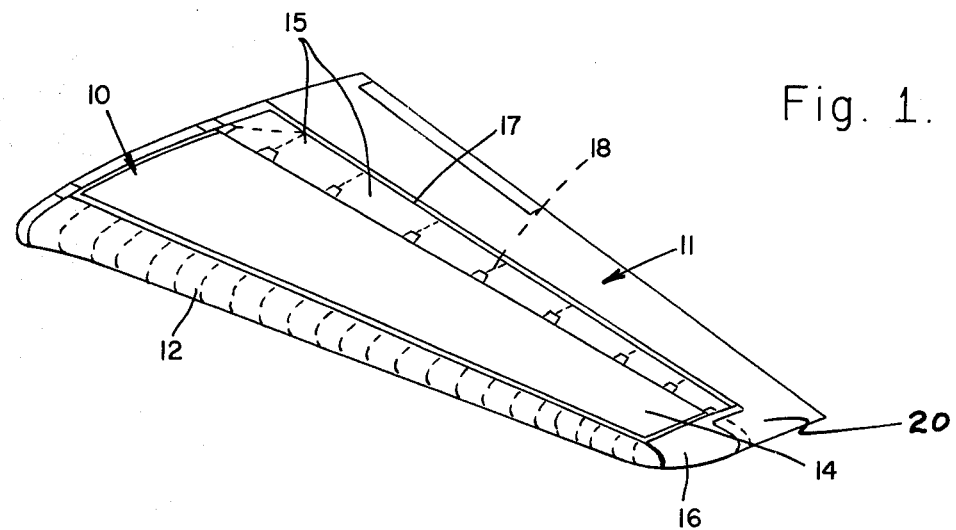
FIG. 1 is a view in perspective of a stabilizer assembly utilizing the temperature compensated linkage of the invention.

Referring now to FIG. 1, there is illustrated a stabilizer 10 and elevator 11 which may, for example, form part of the tail assembly of a jet plane. The stabilizer 10 has a leading edge 12, a structural box 14 and a plurality of trailing edge panels 15. The stabilizer also includes a tip fairing 16. Furthermore, the stabilizer has a trailing edge beam 17 which is connected to the structural box 14 by support beams 18.

The elevator 11 is hinged to the trailing edge beam 17 as will be presently described. It is adapted to be rotated about the plane of the stabilizer 10 by control means not shown. Finally, the elevator 11 is provided with an elevator tip horn structure 20. This provides balance at the trailing edge of the elevator.

It will be realized that the space between the trailing edge beam 17 and the forward edge of the elevator 11 should remain constant and is controlled by tight tolerances. If this gap should open or be reduced the aerodynamic properties of the tail assembly may change radically and cause various problems.

Figure 2:
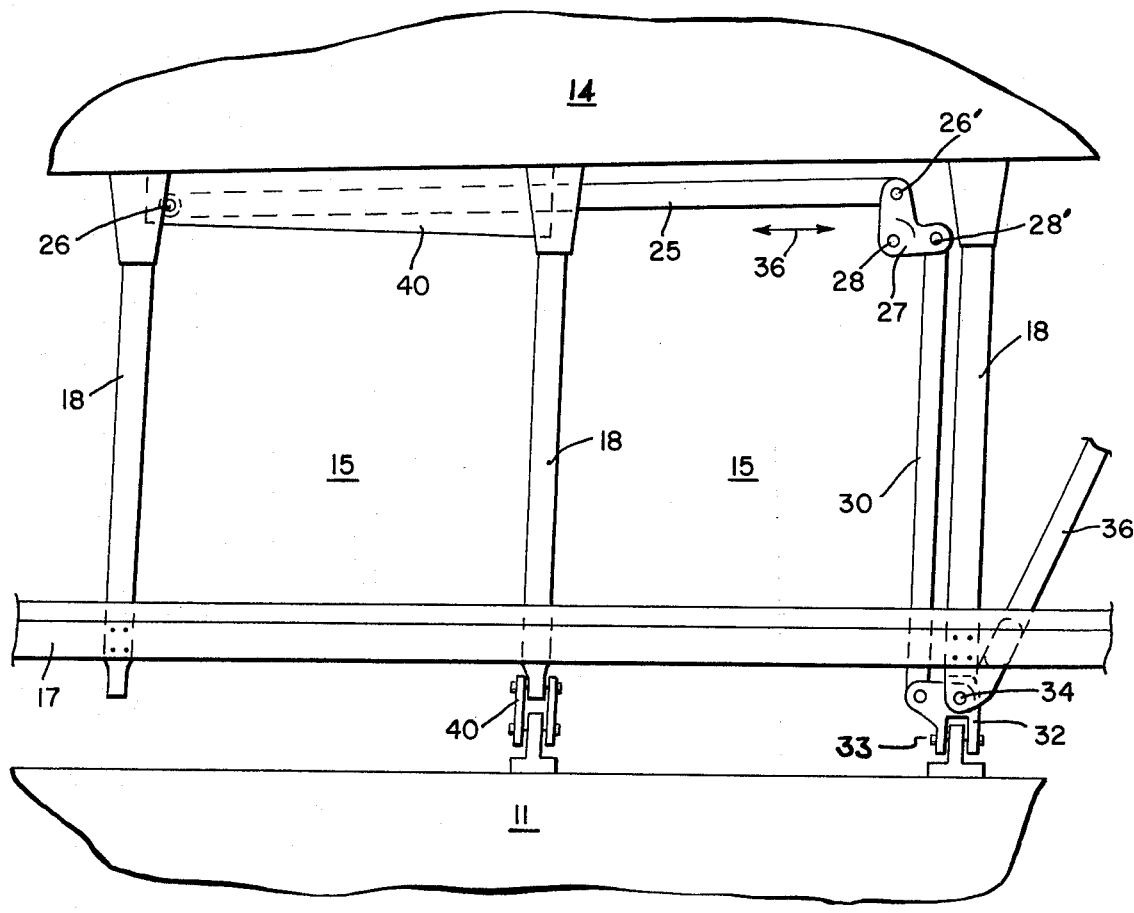
FIG. 2 is a top elevational view of a portion of the stabilizer of FIG. 1 and its elevator and illustrating particularly the passive linkage of the invention.

Referring now to FIG. 2 there is shown in detail the temperature compensating linkage of the invention. This linkage is a passive or generally fixed linkage. In other words, it will only move in response to temperature variations. The stabilizer box 14 of FIG. 2 preferably consists of a graphite epoxy composite as does the trailing edge beam 17. On the other hand, the elevator 11 consists of an aluminum-fiberglass structure.

The temperature compensating linkage includes a strut 25 which may, for example, consist of aluminum, that is of the same metal which is used for the elevator 11. The strut 25 has a fixed pivot at 26 to the support beam 18 or the stabilizer box 14. Its other end is pivoted at 26' to a bell crank 27 having a fixed pivot at 28. The other end of the bell crank 27 has a pivot at 28' to which is connected a push rod 30.

The push rod 30 in turn is connected to a side load hinge fitting 32 at the pivot point 33. The hinge fitting 32 itself is pivoted at 34, for example, to one of the supporting beams 18.

The operation of this linkage will now become evident. As the temperature increases or decreases the strut 25 will move as shown by the arrow 36. Thus assuming a rise in temperature the strut 25 will elongate. This will rotate the bell crank lever 27 in a clockwise direction. This in turn will push the push rod 30 downwards hence rotating the side load hinge fitting 32 in a counter clockwise direction about its fixed pivot 34.

It will, of course, be understood that if the temperature should decrease the reverse action takes place. Also shown in FIG. 2 is a side load strut 36. This will resist yaw forces which may be exerted on the elevator in flight.

It will also be noted that an open clevis 40 is hinged to one of the support beams 18 and has a sliding hinge pin and in turn supports the elevator 11.

Hence the linkage system of the invention significantly reduces the relative motion between the elevator tip horn structure 20 and the adjacent fairing at temperature extremes.

Hence it will be realized that the linkage of the invention makes it possible to utilize the aluminum-fiberglass elevator 11 which is interchangeable with that of other planes.

Also shown in FIG. 2 is a balance panel support 40 which may extend between two of the structural members 18.

It will be understood that the linkage of the invention may also be used on the wing assembly of an airplane or in other suitable places.

What is claimed is:

1. In an aircraft of the type having a stabilizer and an elevator following the trailing edge of the stabilizer, the stabilizer and elevator consisting of materials having substantially different coefficients of expansion, a passive linkage for interconnecting the stabilizer and elevator, said linkage comprising:
   (a) a strut disposed substantially parallel to the trailing edge of the stabilizer and having one end fixed to the stabilizer;
   (b) a bell crank having a fixed pivot point and capable of rotating about said pivot point, said bell crank having two arms, one of said arms being pivoted to the other end of said strut;
   (c) a push rod pivoted to the other arm of said bell crank and extending substantially at right angles to the trailing edge of the stabilizer; and
   (d) a plurality of hinge means on said elevator for connecting the elevator to the stabilizer and permitting it to swing out of the plane of the stabilizer, an outermost one of said hinge means being pivoted to said push rod, whereby said outermost hinge means moves in the direction of said strut in response to temperature variations causing differential expansion or contraction between the elevator and stabilizer.

2. A linkage as defined in claim 1 wherein the elevator includes a metal and said strut includes the same metal as does the elevator.

3. A linkage as defined in claim 1 wherein said outermost hinge means is a side load hinge fitting.

4. A linkage as defined in claim 3 wherein another one of said hinge means includes a sliding hinge pin.

5. In an aircraft of the type having a stabilizer and an elevator following the trailing edge of the stabilizer, the stabilizer including a graphite epoxy and the elevator including aluminum-fiberglass having substantially different coefficients of expansion, a passive linkage for interconnecting the stabilizer and elevator, said linkage comprising:
   (a) a strut disposed substantially parallel to the trailing edge of the stabilizer and having one end fixed thereto;
   (b) a bell crank having a fixed pivot point and capable of rotating about the pivot point, said bell crank having two arms, one of said arms being pivoted to the other end of said strut;
   (c) hinge means on the elevator each having a fixed pivot point for connecting it to the stabilizer and permitting the elevator to swing out of the plane of the stabilizer; and
   (d) means interconnecting the other arm of said bell crank to one of said hinge means to cause it to move substantially parallel to said strut in response to temperature variations.

6. A linkage as defined in claim 5 wherein said one of said hinge means is a side load hinge fitting.

7. A linkage as defined in claim 6 wherein another one of said hinge fittings is an open clevis having a sliding hinge pin.

* * * * *